United States Patent
Eberlein et al.

(10) Patent No.: US 7,657,575 B2
(45) Date of Patent: Feb. 2, 2010

(54) SEQUENCING UPDATES TO BUSINESS OBJECTS

(75) Inventors: Peter Eberlein, Malsch (DE); Guenter Pecht-Seibert, Muehlhausen (DE); Robert Getzner, Heidelberg (DE)

(73) Assignee: SAP AG, Walldorf (DE)

( * ) Notice: Subject to any disclaimer, the term of this patent is extended or adjusted under 35 U.S.C. 154(b) by 296 days.

(21) Appl. No.: 11/322,600

(22) Filed: Dec. 30, 2005

(65) Prior Publication Data

US 2007/0185720 A1    Aug. 9, 2007

(51) Int. Cl.
*G06F 12/00* (2006.01)
*G06F 17/30* (2006.01)

(52) U.S. Cl. ..................... 707/201
(58) Field of Classification Search ............... 707/201
See application file for complete search history.

(56) References Cited

U.S. PATENT DOCUMENTS

| 6,567,818 | B1 * | 5/2003 | Frey et al. ............... 707/103 R |
| 6,839,564 | B2 * | 1/2005 | Sutinen et al. ............. 455/502 |
| 6,904,330 | B2 * | 6/2005 | Popp et al. ................. 700/110 |
| 7,143,103 | B1 * | 11/2006 | Zisman et al. .............. 707/102 |
| 2002/0026416 | A1 * | 2/2002 | Provinse ..................... 705/39 |
| 2003/0093479 | A1 * | 5/2003 | Mellen-Garnett et al. ... 709/205 |
| 2004/0260652 | A1 * | 12/2004 | Rose ........................... 705/51 |
| 2005/0071286 | A1 * | 3/2005 | Laicher et al. ............. 705/400 |
| 2005/0257210 | A1 * | 11/2005 | Stienhans et al. .......... 717/170 |
| 2007/0005340 | A1 * | 1/2007 | Goutte et al. ................. 704/9 |

* cited by examiner

*Primary Examiner*—Isaac M Woo
*Assistant Examiner*—Van H Ngo
(74) *Attorney, Agent, or Firm*—Kenyon & Kenyon LLP

(57) ABSTRACT

A system and method for compensating for disruptions to update transmissions is disclosed. A first application component stores an instance of a business object. The first application component reconciles the instance with data stored on a second application component. The first application component receives a business object update from the second application component. The first application component checks a reconciliation value associated with the business object update. If the first reconciliation value indicates the first business object update was sent after the reconciliation, the first application component applies the business object update to the instance.

19 Claims, 11 Drawing Sheets

100

110

200

300

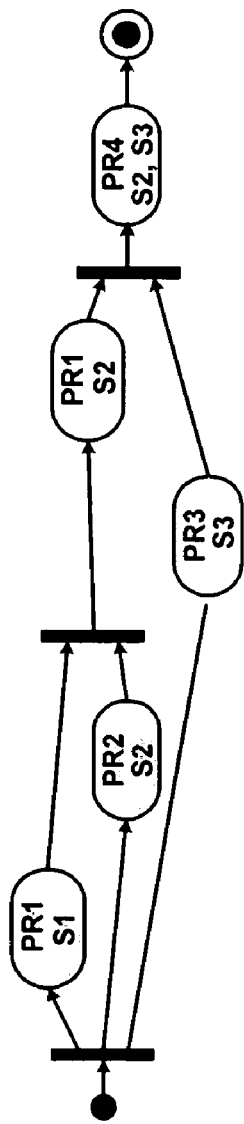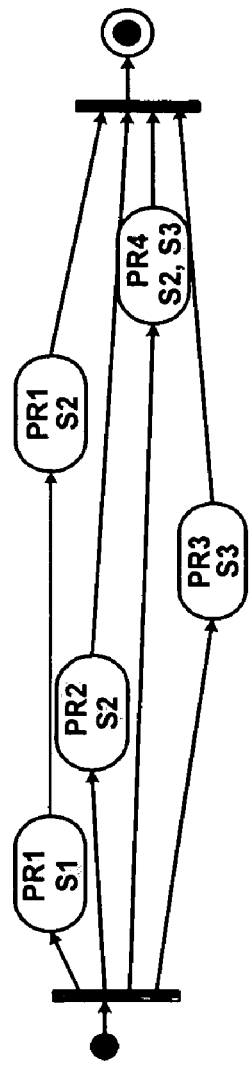
Figure 4a 400
Figure 4b 410

500

510

520

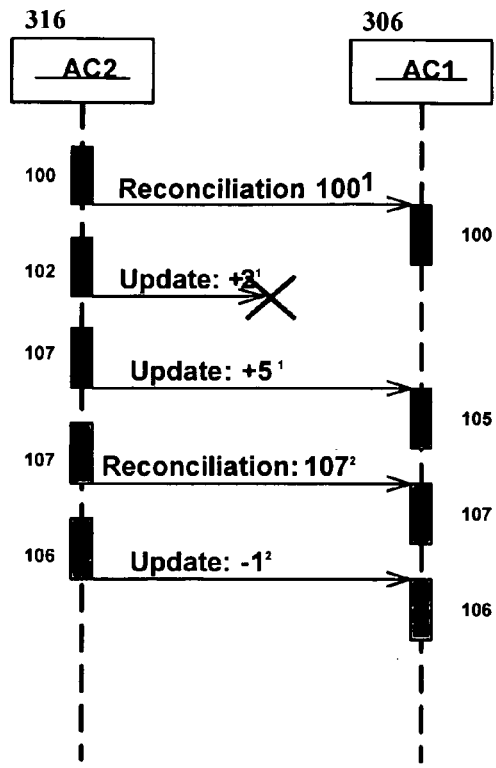 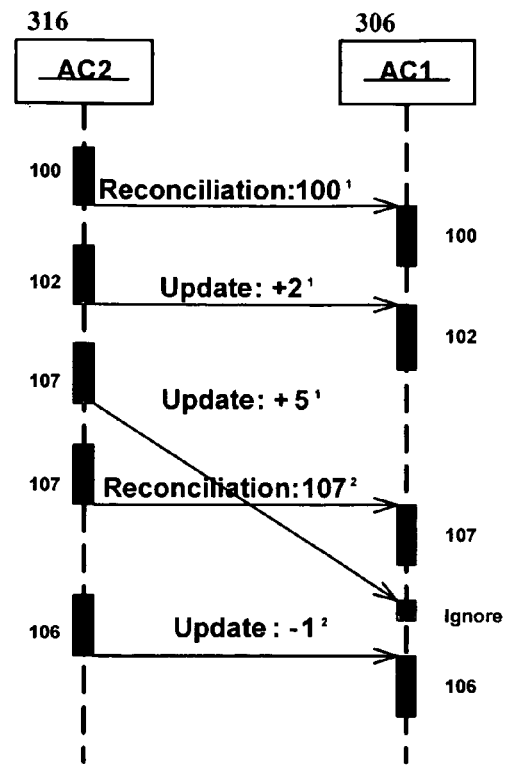
Figure 6a
600
Figure 6b
610

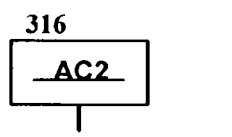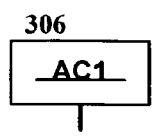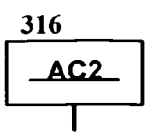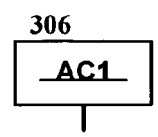
Figure 6c
620
Figure 6d
630

700

800

850

855

1100

SEQUENCING UPDATES TO BUSINESS OBJECTS

BACKGROUND

The present invention relates to a system for updating business objects and, in particular, compensating for disruptions to update transmissions.

Large software applications are often composed of unmanageably large amounts of executable code. In order to facilitate creation and management of large software systems, then, the systems are often composed of many different business objects. Business objects are software components that encompass data, business rules, communication components and any other code that may relate to their function.

In order to simplify design of these large systems, business objects are often defined as collections of logically related functions and data. A large application designed to facilitate a typical business may have many different business objects. An ordering business object may be used to handle incoming orders or changes to existing orders. A shipping business object may be implemented to handle all shipping related tasks, such as arranging for deliveries or determining shipping times and costs. Business objects may handle some tasks independently while communicating with other business objects to complete other tasks.

This design model suffers from several problems however. First, storing many different components all in one business object may make operation slower. Whenever one part of the business object is acting, the others may be suspended until that action is complete. Thus, if one business object communicates with another business object in order to perform a coordinated action, both business objects will be locked until that operation is complete. Users would be unable to use the objects, nor would other business objects be able to communicate with them, until the operations were completed.

Another serious problem occurs when a user wishes to update any aspect of their system. Updates to an instance of a business object in one application component may be sent from a second application component. This second application component may have a second instance of the business object, an instance of a second business object with a related aspect to that business object, or some other feature requiring a change to the first instance of the first business object. Multiple updates to the business object may occur. FIG. 1a shows this process 100 when perfect transmission of these updates occur. An inventory management system 102 may store an instance of a business object reflecting inventory data stored in a database 104. The inventory data is regularly updated, with these updates being sent to the inventory management system 102 to be reflected in the business object instance. As long as these updates were received in the sequence that they were sent, the system would function.

FIG. 1b shows a process 110 with imperfect transmission of updates. The update setting the inventory to 130 is overwritten by the update sent previously but received subsequently setting the inventory to 80. This may result in further errors as this misinformation is propagated from the business object instance to other application components.

What is needed is a method of compensating for sequencing errors in the transmission of updates.

BRIEF DESCRIPTION OF THE DRAWINGS

FIGS. 4a-b illustrate alternate embodiments of update message types.

FIGS. 6a-d illustrate various scenarios under the present invention.

DETAILED DESCRIPTION

A system and method for compensating for disruptions to update transmissions is disclosed. A first application component stores an instance of a business object. The first application component reconciles the instance with data stored on a second application component. The first application component receives a business object update from the second application component. The first application component checks a reconciliation value associated with the business object update. If the first reconciliation value indicates the first business object update was sent after the reconciliation, the first application component applies the business object update to the instance.

Figure 1A:
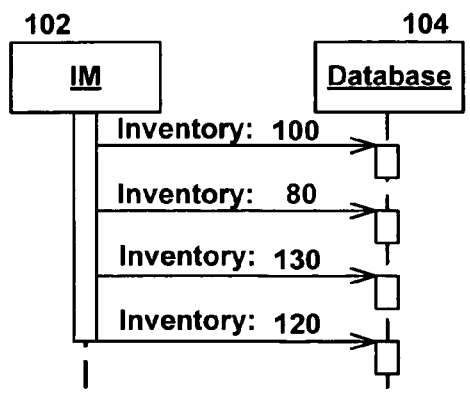
FIGS. 1a-b illustrate transmission of business object updates under the prior art.
Figure 1B:
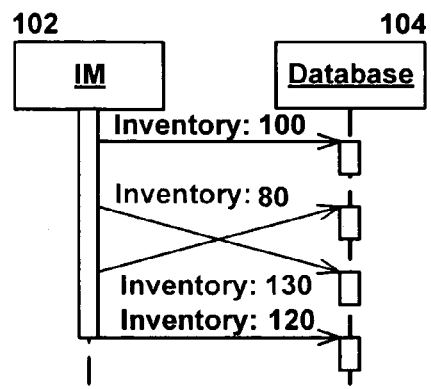
Figure 2:
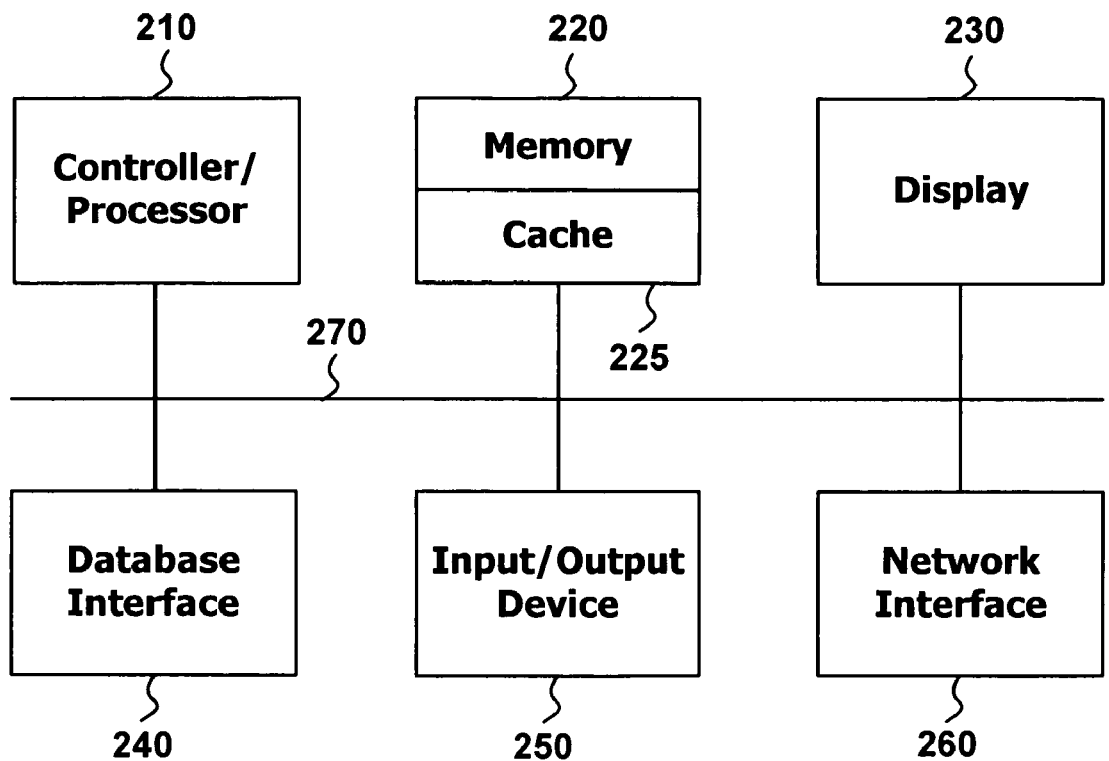
FIG. 2 illustrates one embodiment of a computer system to implement the application components under the present invention.

FIG. 2 illustrates one embodiment of a computer system 200 to implement application components under the present invention. The computer system 200 may include a controller/processor 210, a memory 220 with a cache 225, display 230, database interface 240, input/output device interface 250, and network interface 260, connected through bus 270.

The controller/processor 210 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The memory 220 may include volatile and nonvolatile data storage, including one or more electrical, magnetic or optical memories such as a RAM, cache, hard drive, CD-ROM drive, tape drive or removable storage disk. The memory may have a cache 225 to speed access to specific data.

The Input/Output interface 250 may be connected to one or more input devices that may include a keyboard, mouse, pen-operated touch screen or monitor, voice-recognition device, or any other device that accepts input. The Input/Output interface 250 may also be connected to one or more output devices, such as a monitor, printer, disk drive, speakers, or any other device provided to output data.

The network interface 260 may be connected to a communication device, modem, network interface card, a transceiver, or any other device capable of transmitting and receiving signals over a network. The components of the computer system 200 may be connected via an electrical bus 270, for example, or linked wirelessly.

Client software and databases may be accessed by the controller/processor 210 from memory 220 or through the database interface 240, and may include, for example, database applications, word processing applications, the client side of a client/server application such as a billing system, as well as components that embody the decision support functionality of the present invention. The computer system 200 may implement any operating system, such as Windows or UNIX, for example. Client and server software may be written in any programming language, such as ABAP, C, C++, Java or Visual Basic, for example.

Figure 3:
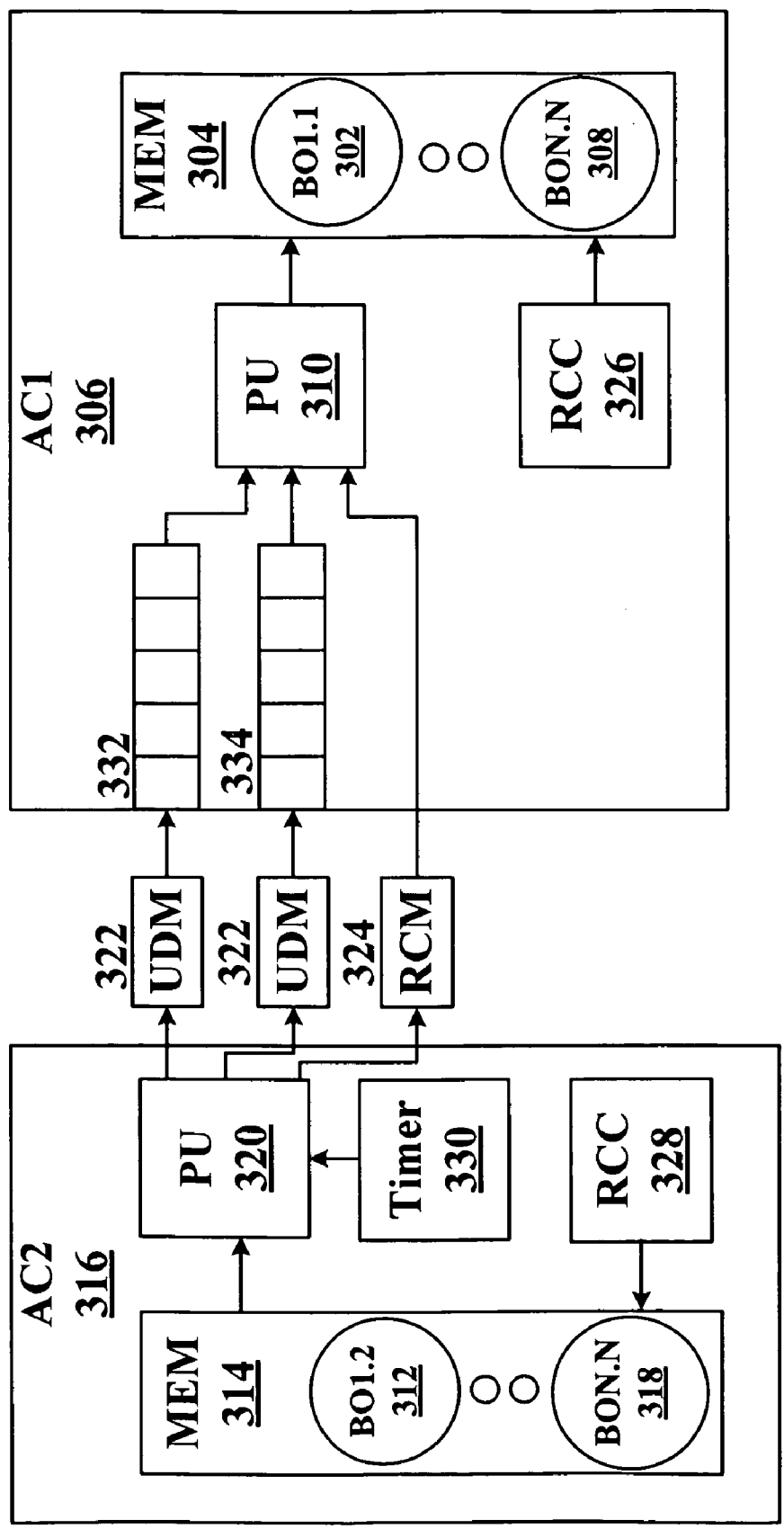
FIG. 3 illustrates one embodiment for a system to implement the present invention.

FIG. 3 illustrates one embodiment for a system 300 to implement the present invention. A first instance 302 of a first business object (BO1.1) may be stored in the memory (MEM) 304 of a first application component (AC1) 306. Additional instances 308 of additional business objects (BON.N) may also be stored in the memory 304. A first processing unit (PU) 310 may manage and process the business objects. A second instance 312 of the first business object (BO1.2) may be stored in the memory (MEM) 314 of a second application component (AC2) 316. Additional instances 318 of additional business objects (BON.N) may also be stored in the memory 314. A second processing unit (PU) 320 may manage and operate the business objects. The application components may be separate components of a single software application, separate connected software applications running on a single device, separate devices running connected software applications, or other networked components.

The second application component 316 may send an update message (UDM) 322 to the first application component 306 to initiate a change in an aspect, or set of data, of the first instance 302. The update message 322 may represent a change to a second instance 312 of the first business object, a change to a related business object, or some other data that would need to be reflected in the first instance 302. FIG. 4a illustrates one embodiment of a series of absolute updates 400 and their dependencies, using stock items as an example. For absolute updates, the exact value resulting from the change to the business object may be sent. If multiple updates depending on preceding updates are combined in one single message, a network of dependences is created. Each PRx represents a production request, each Sy a stock item, both types combined as one instance of a production request and multiple instances of stock items in one message. Arrows depict dependencies, bars depict combinations of dependencies. FIG. 4b illustrates one embodiment of a series of delta updates 410 and their dependencies, using stock items as an example. For delta updates, the amount of change in a value may be sent. Delta updates have the added advantage of making the changes commutative, resolving the network of updates into independent chains of dependencies. Additionally, the updates may be processed out of order.

A reconciliation message (RCM) 324 may be sent to overwrite the first instance 302 or an aspect of the first instance 302 so that it matches the data stored on the second application component 316 exactly. A first reconciliation counter 326 or set of reconciliation of counters (RCC) of the first application component 306 may track which was the most recent reconciliation message processed. The first application component 306 may have one reconciliation counter 326 for all the business objects, a reconciliation counter 326 for each business object, a reconciliation counter 326 for each aspect of each business object, or some combination of reconciliation counters 326 to business object aspects. A second reconciliation counter 328 or set of reconciliation of counters (RCC) of the second application component 316 may track which was the most recent reconciliation message processed. The second application component 316 may have one reconciliation counter 328 for all the business objects, a reconciliation counter 328 for each business object, a reconciliation counter 328 for each aspect of each business object, or some combination of reconciliation counters 328 to business object aspects.

Figure 5A:
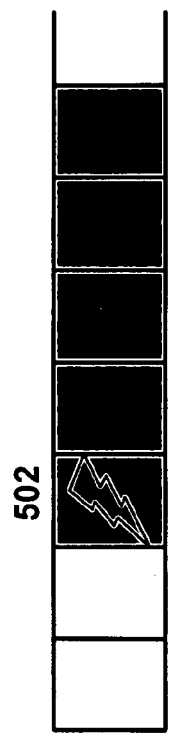
FIGS. 5a-c illustrate in a block diagram various results to disruptions to the reception queue.
Figure 5B:
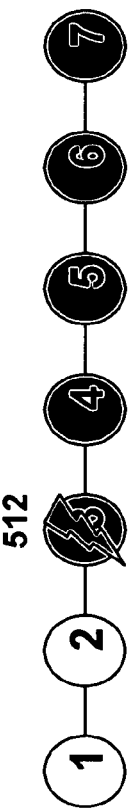
Figure 5C:
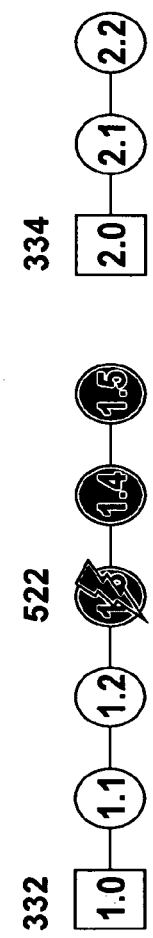

The reconciliation message 324 may be sent based on a timing interval set by a timer 330, a disruption to transmission of the update messages 322, or any other trigger. In one embodiment, the update message 322 or the reconciliation message 324 may be received by a queue 332 until a disruption occurs, at which point the update message 322 may be received by a second queue 334. The application component 306 may receive a reconciliation message 324 directly. The first application component 306 may have multiple queues. FIG. 5a illustrates a stalled queue 500. An occurrence of an error or some other disruption 502 may cause the queue to stall, preventing the processing of any data following the disruption 502. FIG. 5b illustrates a broken series of data 510. An occurrence of an error or some other disruption 512 may prevent the processing of the rest of the series of updates. FIG. 5c illustrates the use 520 of multiple queues to continue to receive update messages. Once a stall 522 occurs in a first queue 332, the messages are shifted to the second queue 334. A reconciliation message 324 may be used to initialize the second queue 334 after a disruption.

FIGS. 6a-d illustrate various scenarios that may result under the present invention. FIG. 6a illustrates one embodiment of a dropped message scenario 600. In this scenario, an update message may be dropped between the second application component 316 and the first application component 306. The reconciliation message may reset the business object to contain the proper data. FIG. 6b illustrates one embodiment of a delayed update message scenario 610. In this scenario, an update message may be delayed until after the reconciliation message is received. The update message may be ignored, as the data has already been included in the reconciliation message. FIG. 6c illustrates an alternative embodiment of a delayed update message scenario 620. In this scenario, an update message may be delayed until after another update message but before the reconciliation message is received. The update message may be processed, as the data has not already been included in the reconciliation message. FIG. 6d illustrates one embodiment of a delayed reconciliation message scenario 630. In this scenario, a reconciliation message may be delayed until after a later update message is received. The update message may be applied and additionally stored temporarily, and applied again once the reconciliation message has been received and processed.

Figure 7:
FIG. 7 illustrates in a block diagram one embodiment of an update/reconciliation message.

FIG. 7 illustrates in a block diagram one embodiment of an update/reconciliation message 700. The message 700 may have a header 702 containing any data important for transmission. The message 700 may have an application component address (ACA) 704, to identify which application component for which the message 700 is intended. A create/delete flag 706 may indicate if the data contained in the message is to create or delete a business object instance. A reconciliation flag (RCF) 708 may indicate if the message is a reconciliation message or an update message. A first body object identifier (BOID1) 710 may identify which business object to which that portion of the message applies. A first aspect identifier (AID1) 712 may identify which aspect of the business object to which that portion of the message applies. A first reconciliation value (RCV1) 714 may indicate which reconciliation it is, if a reconciliation message, or what the previous reconciliation message was, if an update message. The first body (BODY1) of the message 716 may contain the update data or reconciliation data. A message may contain a single reconciliation or update, multiple reconciliations, multiple updates, or a combination of reconciliations and updates. For example, the message 700 may have a second body object identifier (BOID2) 718 may identify which business object to which that portion of the message applies. A second aspect identifier (AID2) 720 may identify which aspect of the business object to which that portion of the message applies. A second reconciliation value (RCV2) 722 may indicate what the previous reconciliation message was. The second body (BODY2) of the message 724 may contain the update data.

Figure 8:
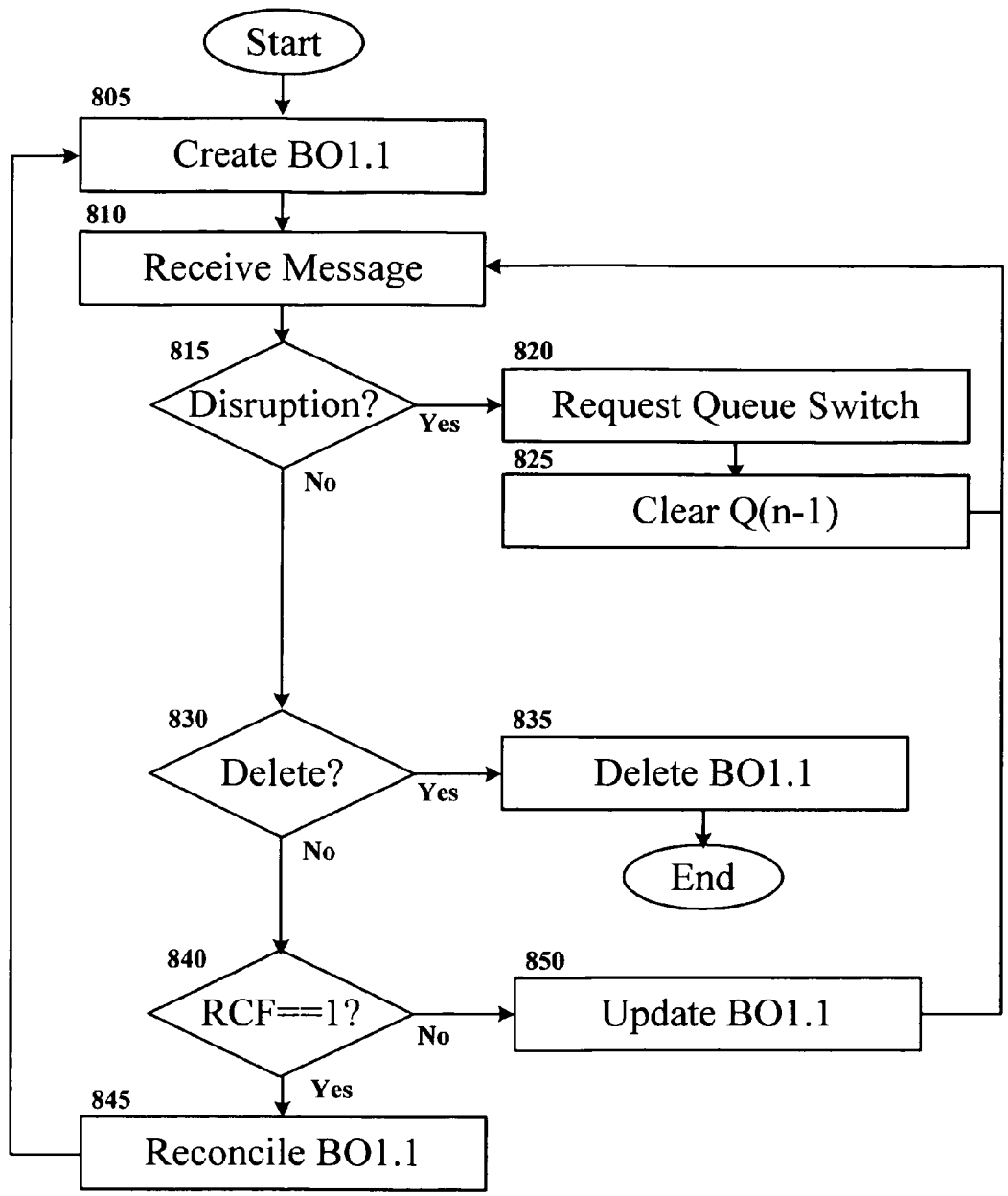
FIG. 8 illustrates in a flowchart one embodiment of a method of receiving update messages.

FIG. 8 illustrates in a flowchart one embodiment of a method 800 of receiving update messages. The first application component (AC1) 306 may create a first instance of the business object (BO1.1) 302 (Block 805). AC1 306 may receive a message 700 from the second application component (AC2) 316 or from some other transmitter (Block 810). If AC1 306 detects a disruption in the queue receiving the messages (Block 815), such as through the generation of a consistency report, the AC1 may request that the second application component (AC2) start sending messages to the next queue (Block 820). The previous queue may be cleared of messages (Block 825). AC1 306 then waits to receive the next message 700 (Block 810). If the message 700 is a delete message (Block 830), AC1 306 may delete BO1.1 302 (Block 835). If the message is a reconciliation message 324 (Block 840), AC1 306 may perform the reconciliation function described in FIG. 9 on BO1.1 302 (Block 845). AC1 306 then waits to receive the next message 700 (Block 810). If the message is an update message 322 (Block 840), AC1 306 may perform the update function described in FIG. 10 on BO1.1 302 (Block 850). AC1 306 then waits to receive the next message 700 (Block 810).

Figure 9:
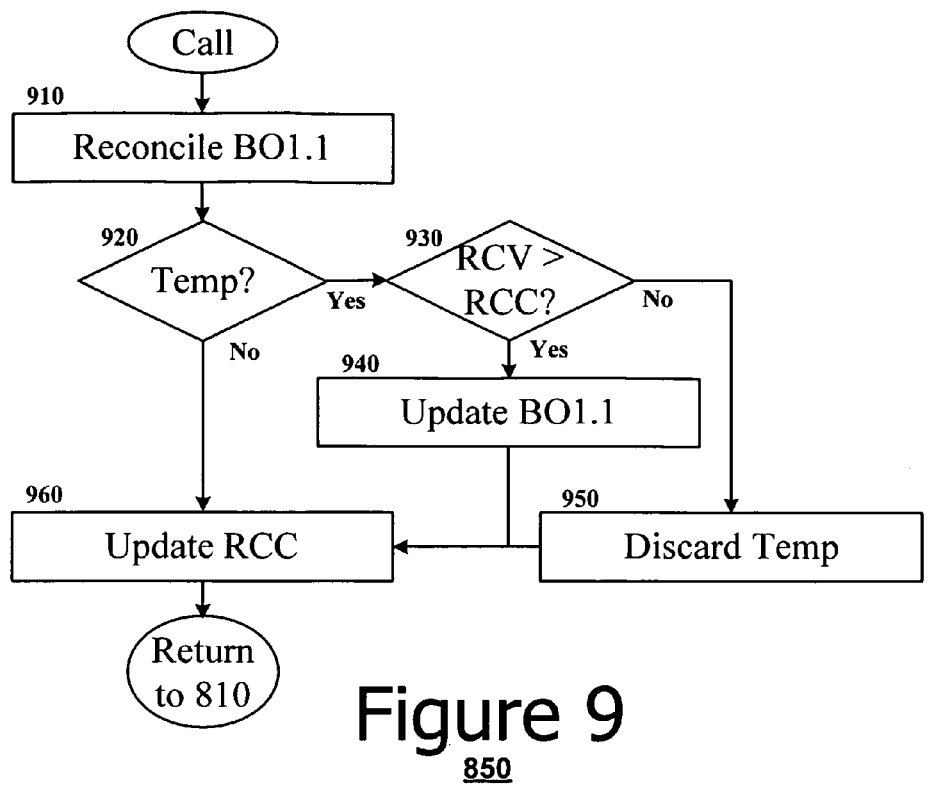
FIG. 9 illustrates in a flowchart one embodiment of the reconciliation.

FIG. 9 illustrates in a flowchart one embodiment of the reconciliation 850. AC1 306 may reconcile BO1.1 302 with BO1.2 (Block 910). If one of the previous updates has been stored as a temporary update (Block 920) and the temporary update's reconciliation value (RCV) is greater than the value of the reconciliation counter 326 (RCC) (Block 930), AC1 306 may apply the temporary update to the proper aspect of BO1.1 302 (Block 940). If the temporary update's RCV is not greater than the value of the RCC 326 (Block 930), AC1 306 may discard the temporary update (Block 950). AC1 306 may set RCC 326 for that aspect of BO1.1 to the RCV of the reconciliation message received (Block 960).

Figure 10:
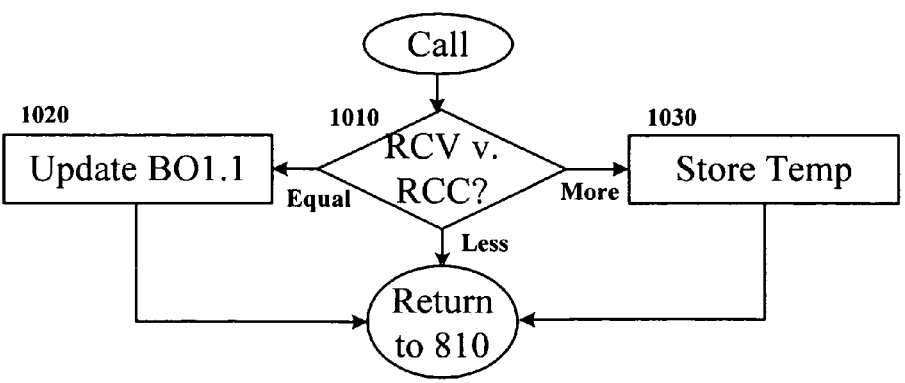
FIG. 10 illustrates in a flowchart one embodiment of the update.

FIG. 10 illustrates in a flowchart one embodiment of the update 855. If the RCV equals the RCC 326 (Block 1010), AC1 306 may update BO1.1 (Block 1020). If the RCV is greater than the RCC 326 (Block 1010), AC1 306 may update BO1.1 and additionally store the update message 322 as a temporary update (Block 1030). If the reconciliation value is less than the reconciliation counter (Block 1010), No further action is required.

Figure 11:
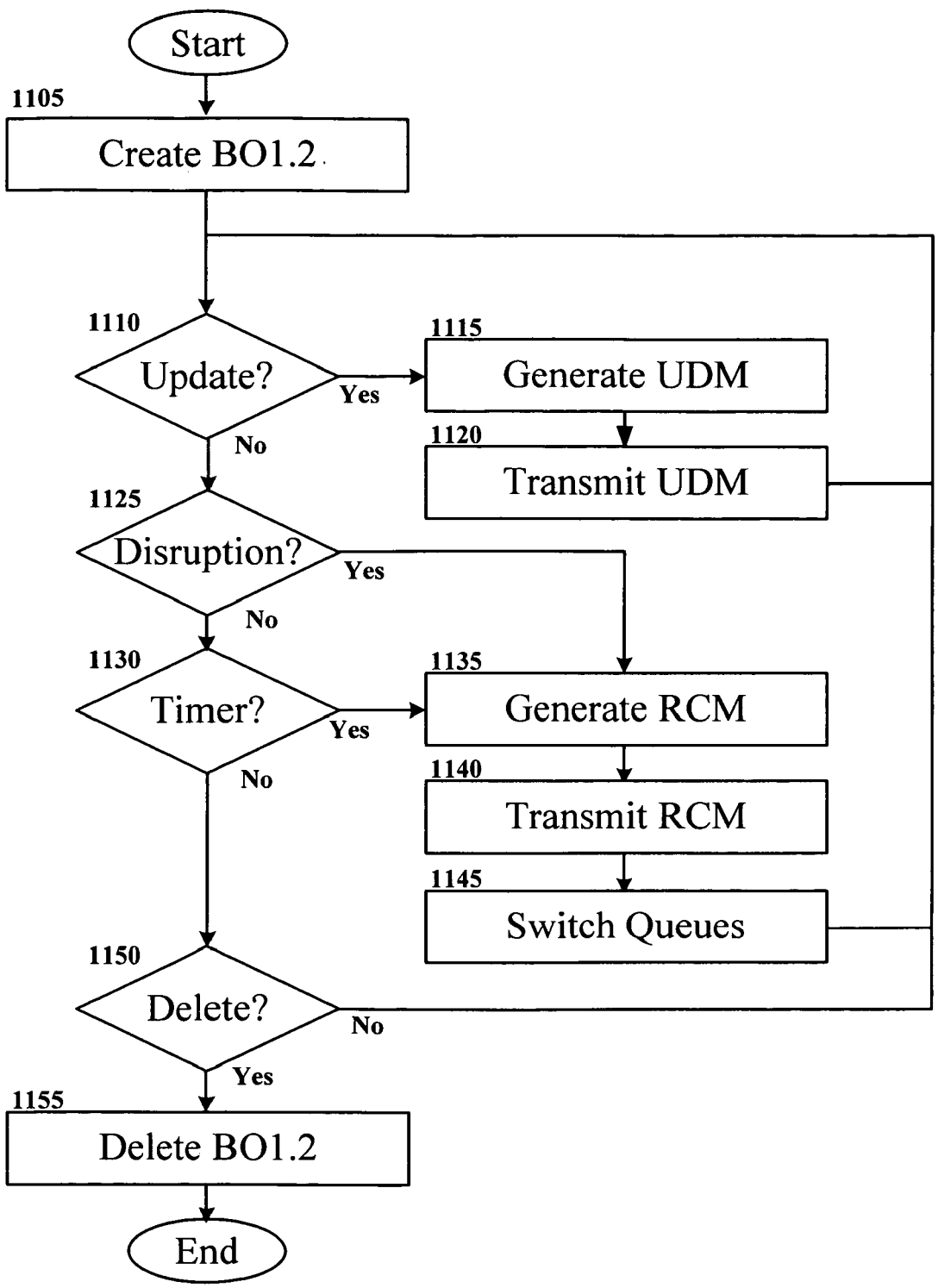
FIG. 11 illustrates in a flowchart one embodiment of a method of transmitting update messages.

FIG. 11 illustrates in a flowchart one embodiment of a method 1100 of transmitting update messages. AC2 316 may create BO1.2 312 (Block 1105). If an update to BO1.2 312 occurs (Block 1110), AC2 may generate an update message (UDM) 322 (Block 1115) and may transmit the UDM 322 to AC1 (Block 1120). AC2 may then await the next update (Block 1110). If AC2 notices a disruption to the transmissions (Block 1125) or a set period of time has elapsed (Block 1130), AC2 may generate a reconciliation message (RCM) 324 (Block 1135) and transmit the RCM 324 to AC1 (Block 1140). If the updates are absolute updates, the AC2 may also switch destination queues (Block 1145). For delta updates, no queues or queue switching is required. AC2 may then await the next update (Block 1110). If needed (Block 1150), AC2 may delete BO1.2 (Block 1155).

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of compensating for sequencing errors in the transmission of updates to business objects within an inventory management system stored on a computer readable medium, comprising:

storing, in a first computer memory, a first instance of a business object of a first application component, including a count value associated with data stored in the first instance;

receiving, in a first queue of the first application component, update messages including data associated with a second application component, wherein the second application component data is stored in a second computer memory;

overwriting the data of the first instance with the second application component data;

if a disruption is detected in said receiving of update messages, the detected disruption causing the first queue to stall:

receiving a reconciliation message from the second application component in a second queue of the first application component, the reconciliation message including reconciliation data and a reconciliation value; and discarding the second application component data update messages from the first queue;

comparing the reconciliation value with the count value;

if the reconciliation value is greater than the count value, overwriting the data of the first instance with the reconciliation data and setting the count value equal to the reconciliation value; and if the reconciliation value is less than or equal to the count value, discarding the reconciliation message.

2. The method of claim 1, further comprising detecting a disruption based on a consistency report.

3. The method of claim 1, wherein the update messages comprise delta updates.

4. The method of claim 1, wherein the update messages comprise absolute updates.

5. The method of claim 1, wherein:

the reconciliation data comprises a first reconciliation data portion and a second reconciliation data portion; and the first and second reconciliation data portions apply, respectively, to a first aspect and a second aspect of the first instance of the business object.

6. The method of claim 5, wherein:

the reconciliation message comprises a first reconciliation value and a second reconciliation value, the first and second reconciliation values associated, respectively, with the first reconciliation data portion and the second reconciliation data portion; and said comparing comprises comparing the first reconciliation value with a first count value, the first count value associated with the first aspect of the first instance, and comparing the second reconciliation value with a second count value, the second count value associated with the second aspect of the first instance.

7. A computer readable medium storing a set of program instructions adapted to perform a compensating for sequencing errors in the transmission of updates to business objects, comprising:

storing a first instance of a business object of a first application component, including a count value associated with data stored in the first instance;

receiving, in a first queue of the first application component, update messages including data associated with a second application component;

overwriting the data of the first instance with the second application component data;

if a disruption is detected in said receiving of update messages, the detected disruption causing the first queue to stall:
    receiving a reconciliation message from the second application component in a second queue of the first application component, the reconciliation message including reconciliation data and a reconciliation value; and
    discarding update messages from the first queue;
    comparing the reconciliation value with the count value;
    if the reconciliation value is greater than the count value, overwriting the data of the first instance with the reconciliation data and setting the count value equal to the reconciliation value; and
    if the reconciliation value is less than or equal to the count value, discarding the reconciliation message.

8. The set of program instructions of claim 7, wherein a disruption is detected based on a consistency report.

9. The set of program instructions of claim 7, wherein the update messages comprise delta updates.

10. The set of program instructions of claim 7, wherein the update messages comprise absolute updates.

11. The set of program instructions of claim 7, wherein:
the reconciliation data comprises a first reconciliation data portion and a second reconciliation data portion; and
the first and second reconciliation data portions apply, respectively, to a first aspect and a second aspect of the first instance of the business object.

12. The set of program instructions of claim 11, wherein:
the reconciliation message comprises a first reconciliation value and a second reconciliation value, the first and second reconciliation values associated, respectively, with the first reconciliation data portion and the second reconciliation data portion; and
said comparing comprises comparing the first reconciliation value with a first count value, the first count value associated with the first aspect of the first instance, and comparing the second reconciliation value with a second count value, the second count value associated with the second aspect of the first instance.

13. An application component of an inventory management system comprising:
a data storage medium to store a first instance of a business object, including a count value associated with data stored in the first instance;
a first queue, defined by a first computer memory portion, to receive update messages to overwrite the first instance with data stored on a second application component;
a second queue, defined by a second computer memory portion, to receive a reconciliation message from the second application component upon detection of a disruption in the receiving of update messages, the disruption causing the first queue to stall, and the reconciliation message including reconciliation data and a reconciliation value;
a processor to discard update messages from the first queue upon the detection of the disruption, to compare the reconciliation value with the count value and, if the reconciliation value is greater than the count value, to overwrite the first instance data with the reconciliation data and to set the count value equal to the reconciliation value, and, if the reconciliation value is less than or equal to the count value, to discard the reconciliation message.

14. The application component of claim 13, wherein a disruption is detected based on a consistency report.

15. The application component of claim 13, wherein the update messages comprise delta updates.

16. The application component of claim 13, wherein the update messages comprise absolute updates.

17. The application component of claim 13, wherein:
the reconciliation data comprises a first reconciliation data portion and a second reconciliation data portion; and
the first and second reconciliation data portions apply, respectively, to a first aspect and a second aspect of the first instance of the business object.

18. The application component of claim 17, wherein:
the reconciliation message comprises a first reconciliation value and a second reconciliation value, the first and second reconciliation values associated, respectively, with the first reconciliation data portion and the second reconciliation data portion; and
the processor is disposed to compare the first reconciliation value with a first count value, the first count value associated with the first aspect of the first instance, and to compare the second reconciliation value with a second count value, the second count value associated with the second aspect of the first instance.

19. A method of compensating for sequencing errors in the transmission of updates to business objects within an inventory management system stored on a computer readable medium, comprising:
storing, in a first computer memory, a first instance of a business object of a first application component, including a count value associated with data stored in the first instance;
receiving, in a first queue of the first application component, update messages from a second application component, wherein the update messages include data associated with the second application component, the second application component storing data in a second computer memory;
overwriting the data of the first instance with the second application component data in the update messages;
if a disruption is detected in said receiving of update messages in the first queue:
    stalling the first queue, preventing the overwriting of data of the first instance with any second application component data in update messages in the first queue;
    switching from the first queue to a second queue of the first application component,
    discarding update messages from the first queue;
    receiving a reconciliation message from the second application component in the second queue, the reconciliation message including reconciliation data and a reconciliation value; and
    comparing the reconciliation value with the count value;
    if the reconciliation value is greater than the count value, overwriting the data of the first instance with the reconciliation data and setting the count value equal to the reconciliation value; and
    if the reconciliation value is less than or equal to the count value, discarding the reconciliation message.

* * * * *